United States Patent
Foo et al.

(10) Patent No.: US 10,571,319 B2
(45) Date of Patent: Feb. 25, 2020

(54) DOPPLER FLOW RADAR

(71) Applicant: Pulsar Process Measurement Ltd., Worcestershire (GB)

(72) Inventors: Andrew Foo, Worcestershire (GB); Steve Lycett, Worcestershire (GB)

(73) Assignee: Pulsar Process Measurement Ltd., Malvern (GB)

( * ) Notice: Subject to any disclaimer, the term of this patent is extended or adjusted under 35 U.S.C. 154(b) by 409 days.

(21) Appl. No.: 15/399,957

(22) Filed: Jan. 6, 2017

(65) Prior Publication Data

US 2017/0199066 A1 Jul. 13, 2017

(30) Foreign Application Priority Data

Jan. 13, 2016 (GB) .................................. 1600604.1

(51) Int. Cl.
*G01F 1/66* (2006.01)
*G01F 23/284* (2006.01)

(52) U.S. Cl.
CPC ............ *G01F 1/663* (2013.01); *G01F 23/284* (2013.01)

(58) Field of Classification Search
CPC .... G01F 1/663; G01F 23/284; G01F 23/2962; G01S 13/58; G01S 13/862; G01S 13/88; G01S 7/28; G06F 13/42
USPC ....................................................... 342/109
See application file for complete search history.

(56) References Cited

U.S. PATENT DOCUMENTS

| 6,014,100 | A | * | 1/2000 | Fehrenbach | G01F 23/284 |
| | | | | | 342/124 |
| 7,861,600 | B2 | | 1/2011 | Mayer et al. | |
| 2006/0243063 | A1 | | 11/2006 | Bussinger | |
| 2010/0123614 | A1 | * | 5/2010 | Nilsson | G01S 7/02 |
| | | | | | 342/124 |
| 2010/0154561 | A1 | | 6/2010 | Cabrera et al. | |
| 2010/0298999 | A1 | * | 11/2010 | Allgaier | G06F 1/3203 |
| | | | | | 700/296 |
| 2011/0000311 | A1 | | 1/2011 | Petroff | |
| 2012/0162003 | A1 | * | 6/2012 | Nilsson | G01F 23/284 |
| | | | | | 342/124 |
| 2015/0007653 | A1 | * | 1/2015 | Fehrenbach | G01P 5/242 |
| | | | | | 73/198 |
| 2015/0007655 | A1 | | 1/2015 | Skowaisa | |
| 2015/0253175 | A1 | * | 9/2015 | Jirskog | G01F 23/284 |
| | | | | | 342/58 |
| 2015/0253176 | A1 | * | 9/2015 | Jirskog | G01F 23/284 |
| | | | | | 342/58 |

(Continued)

FOREIGN PATENT DOCUMENTS

EP 1562051 A2 8/2005
WO 2002044748 A2 6/2002

(Continued)

*Primary Examiner* — Timothy A Brainard
(74) *Attorney, Agent, or Firm* — Fox Rothschild LLP (57) ABSTRACT

A velocity measurement device (17) for measuring the velocity of a moving media (3) in a channel (1), the velocity measurement device (17) including a radar unit (21) having: a radar module (33) arranged to measure the velocity of the media (3) using the Doppler effect; and a two wire interface (23) to the radar unit (21) arranged to receive power from an external power source (35), and provide data transfer between the radar unit (23) and an external control unit (19).

18 Claims, 3 Drawing Sheets

(56) References Cited

U.S. PATENT DOCUMENTS

2015/0276462 A1\* 10/2015 Kleman .............. G01F 25/0076
342/124
2017/0219408 A1\* 8/2017 Dieterle .................... G01S 7/02

FOREIGN PATENT DOCUMENTS

| WO | 2005080923 | A1 | 9/2005 |
| WO | 2011109758 | A2 | 9/2011 |

\* cited by examiner

DOPPLER FLOW RADAR

CROSS-REFERENCE TO RELATED APPLICATIONS

This application claims priority to United Kingdom Patent Application No. 1600604.1, filed Jan. 13, 2016, the disclosure of which is incorporated herein by reference in its entirety.

BACKGROUND OF INVENTION

The present invention relates to a velocity measurement device for measuring the velocity of a moving media in a channel, and to a method for measuring the velocity of a moving media in a channel. In particular, but not exclusively, the velocity measurement may be used to determine the flow of the media in the channel. The device and method measure the velocity using Doppler radar velocity measurement techniques.

There are many different scenarios where it can be useful to measure the flow of a moving media. One example situation is in a sewer system, where measuring the flow of sewage can help locate blockages (from slow flow), predict pumping requirements in pumping stations, predict if spills are to occur, and estimate the amount of sewage spilled where spills do occur.

Typically, the flow can be determined by measuring the velocity and depth of the media. The velocity measurement determines both the speed and direction of movement. One technique used for measuring the velocity is Doppler radar.

Known Doppler radar devices have a control unit and a measurement unit. Doppler radar devices have high power consumption, and so the control unit is typically powered by mains power. Separate connections are used to provide power from the control unit to the measurement unit, and to communicate the measured velocity between the measurement unit and the control unit.

Existing flow measurement devices including Doppler radar for the velocity measurement are bulky and difficult to move and install. This can be problematic when measurements are required in confined spaces, for example sewers, or measurements are only required on a temporary basis.

According to a first aspect of the invention, there is provided a velocity measurement device for measuring the velocity of a moving media in a channel, the velocity measurement device including a radar unit having: a radar module arranged to measure the velocity of the media using the Doppler effect; and a two wire interface to the radar unit arranged to receive power from an external power source, and provide data transfer between the radar unit and an external control unit.

Preferably, the radar unit includes: an energy store arranged to store energy; receive energy available on the two wire interface to charge the energy store; and supply stored energy to the radar module when a velocity measurement is performed.

The power delivered over the two wire interface may be insufficient to power the radar module directly, and the energy stored in the energy store over a period longer than the radar module is operated for is sufficient to power the radar module.

Preferably, the radar module may be arranged to measure the velocity of the moving media within an active period of the two wire interface, wherein the active period is divided into a first portion in which the velocity of the media is measured, and a second portion in which the measured velocity is communicated to the external control unit, and wherein the energy store is charged during at least the first portion of the active period.

Preferably, the radar unit includes: a radar unit controller arranged to: control operation of the radar unit to store energy in the energy store; determine the energy stored in the energy store; determine the proportion of the energy that can be used in a velocity measurement; and control the radar module to measure the velocity based on the determined portion of the energy that can be used.

The radar unit controller may be arranged to vary one or more of: an output power of the radar module; a measurement duration; a number of repeat readings in a measurement; an interval between repeat readings; and a number of individual transmitters and/or receivers used based on the determined portion of the energy that can be used.

The radar unit controller may be arranged to leave a minimum level of energy in the energy store, such that the measurement can be repeated without the energy store being replenished. The radar unit controller may be arranged to omit a velocity measurement if it is determined that the energy store does not have sufficient energy to power the radar module and leave the minimum level of energy in the energy store; and only charge the energy store during the measurement.

The velocity measurement device may include: an external control unit arranged to: control operation of the radar unit; and communicate with the radar unit over the two wire interface. The external control unit may include a power supply for providing power to the radar unit over the two wire interface, and powering operation of the external control unit. The power supply may be a rechargeable power supply. The power supply may be a battery.

The external control unit may be arranged to control the operation of the radar unit such that the velocity is measured intermittently, and the external control unit may be arranged to deactivate the two wire interface between velocity measurements.

The external control unit may be arranged to determine the duration between velocity measurements based on one or more of: a default value, a user input, and one or more previous velocity measurements.

The radar module may be arranged to use microwave radar to measure the velocity of the media.

The radar module may include radar means having: means for transmitting microwaves; means for detecting microwaves reflected from the moving media; and means for determining the velocity of the media based on the reflected microwaves.

The two wire interface may be arranged to carry a maximum current. The current on the two wire interface may be varied between a first current and a second current, both lower than the maximum current, to transfer data between the external control unit and the radar unit. The current on the two wire interface may be higher than the second current to indicate an error message. The current on the two wire interface may be higher than the second current when charging the energy store.

The current on the two wire interface may be modulated when the external control unit is being used to configure the radar unit prior to use.

The radar unit may include a retentive memory to store information relating to the velocity measurements. The memory may be a non-volatile random access memory.

According to a second aspect of the invention, there is provided an external control unit for controlling the operation of a radar unit arranged to measure the velocity of a moving media in a channel using the Doppler effect, the external control unit having: a two wire interface from the external control unit arranged to supply power to the radar unit, and provide data transfer between the external control unit and the radar unit.

The power supply may be a rechargeable power supply. The power supply may be a battery.

The external control unit may include: a controller arranged to: control the operation of the radar unit such that the velocity is measured intermittently; and deactivate the two wire interface between velocity measurements.

The controller may be arranged to determine the duration between velocity measurements based on one or more of: a default value, a user input, and one or more previous velocity measurements.

According to a third aspect of the invention, there is provided a velocity measurement device for measuring the velocity of a moving media in a channel, the velocity measurement device comprising: an external control unit according to the second aspect; and a radar unit arranged to measure the velocity of a moving media in a channel using the Doppler effect, the radar unit in communication with the external control unit over the two wire interface, and provided with power over the two wire interface.

According to a fourth aspect of the invention, there is provided a flow measurement device for measuring the flow rate of a media in a channel, the flow measurement device including: a level measurement device for determining the level of the media in the channel; and a velocity measurement device according to the first aspect or the third aspect, for measuring the velocity of the media in the channel, wherein the flow measurement device is arranged to determine the flow based on the measured level and the measured velocity.

According to a fifth aspect of the invention, there is provided a method of measuring the velocity of a media in a channel, the method including: at a radar unit, receiving power from an external power source over a two wire interface; with a radar module of the radar unit, measuring the velocity of the media in the channel using the Doppler effect; and transferring the measured velocity to an external control unit over the two wire interface.

The method may include at the radar unit, storing the power received over the two wire interface in an energy store; and powering the radar module of the radar unit from the energy store, wherein the power delivered over the two wire interface is insufficient to power the radar module directly, and the energy stored in the energy store over a period longer than the radar module is operated for is sufficient to power the radar module.

Each velocity measurement may occur within an active period of the two wire interface, wherein the active period is divided into a first portion in which the velocity of the moving media is measured, and a second portion in which the measured velocity is communicated to the external control unit. The method may also include charging the energy store during at least the first portion of the active period.

The method may include: determining the energy stored in the energy store; determining the proportion of the energy that can be used in a velocity measurement; and control the radar module to measure the velocity based on the determined portion of the energy that can be used.

The method may include varying one or more of: an output power of the radar module; a measurement duration; a number of repeat readings in a measurement; an interval between repeat readings; and a number of individual transmitters and/or receivers used based on the determined portion of the energy that can be used.

Determining the proportion of the energy that can be used in a velocity measurement may include leaving a minimum level of energy in the energy store, such that the measurement can be repeated without the energy store being replenished. The method may include omitting a velocity measurement if it is determined that the energy store does not have sufficient energy to power the radar module and leave the minimum level of energy in the energy store, and only charge the energy store during the first portion of the active period.

The method may include: using an external control unit to control operation of the radar unit.

The external control unit may include a power source for providing power to the radar unit over the two wire interface, and powering the control unit. The method may include: powering the radar unit from the external control unit.

The method may include: powering the external control unit with a rechargeable power supply. The method may further include: powering the control unit with a battery.

The method may include: measuring the velocity intermittently; and deactivating the two wire interface between velocity measurements.

The method may include: determining the duration between velocity measurements based on one or more of: a default value, a user input, and one or more previous velocity measurements.

The method may include using microwave radar to measure the velocity of the media.

The method may include: varying the current on the two wire interface between a first current and second current, to transfer data between the control unit and the radar unit. The method may include setting the current on the two wire interface higher than the second current, and lower than a maximum current to indicate an error message. The method may include setting the current on the two wire interface higher than the second current, and lower than a maximum current during charging of the energy store.

The current on the two wire interface may be higher than the second current when the control unit is being used to configure the radar unit, prior to use.

According to a sixth aspect of the invention, there is provided a method of measuring the flow of a moving media in a channel, the method including: measuring the level of media in the channel; measuring the velocity of the media in the channel according to the fifth aspect; and determining the flow based on the measured level and the measured velocity.

According to a seventh aspect of the invention, there is provided a machine readable medium having instructions which when read by a machine cause the machine to perform the method of the fifth or sixth aspect.

The machine readable medium referred to in any of the above aspects of the invention may be any of the following: a CDROM; a DVD ROM/RAM (including −R/−RW or +R/+RW); a hard drive; a memory (including a USB drive; an SD card; a compact flash card or the like); a transmitted signal (including an Internet download, ftp file transfer of the like); a wire; etc.

Features described in relation to any of the above aspects of the invention may be applied, mutatis mutandis, to any of the other aspects of the invention.

BRIEF DESCRIPTION OF THE DRAWINGS

The invention will now be described, by way of example only, with reference to the accompanying drawings, in which.

DETAILED DESCRIPTION

Figure 1:
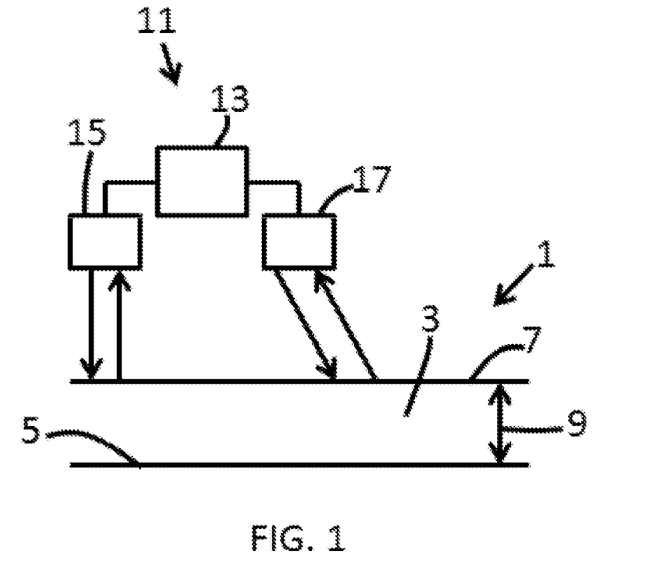
FIG. 1 schematically illustrates a channel including a device for measuring the flow of media in the channel.

FIG. 1 shows a schematic illustration of a channel 1 carrying a flowing media 3, such as water. A flow measurement device 11 is positioned in the channel 1, above the water surface 7, to measure the flow rate of the water 3. The flow measurement device 11 includes a level measurement device 15, and a velocity measurement device 17.

The level measurement device 15 emits ultrasound waves, receives reflections from the water surface 7, and, based on the time of flight, determines the distance from the level measurement device 15 to the water surface 7. Using the known distance from the level measurement device 15 to the base 5 of the channel 1, the depth of the water can be determined.

Similarly, the velocity measurement device 17 uses reflections of waves from the water surface 7 to determine the velocity of the water 3 in the channel 1.

The level measurement device 15 and velocity measurement device 17 pass the determined depth and velocity to a controller 13, which uses these variables to determine the flow.

Figure 2:
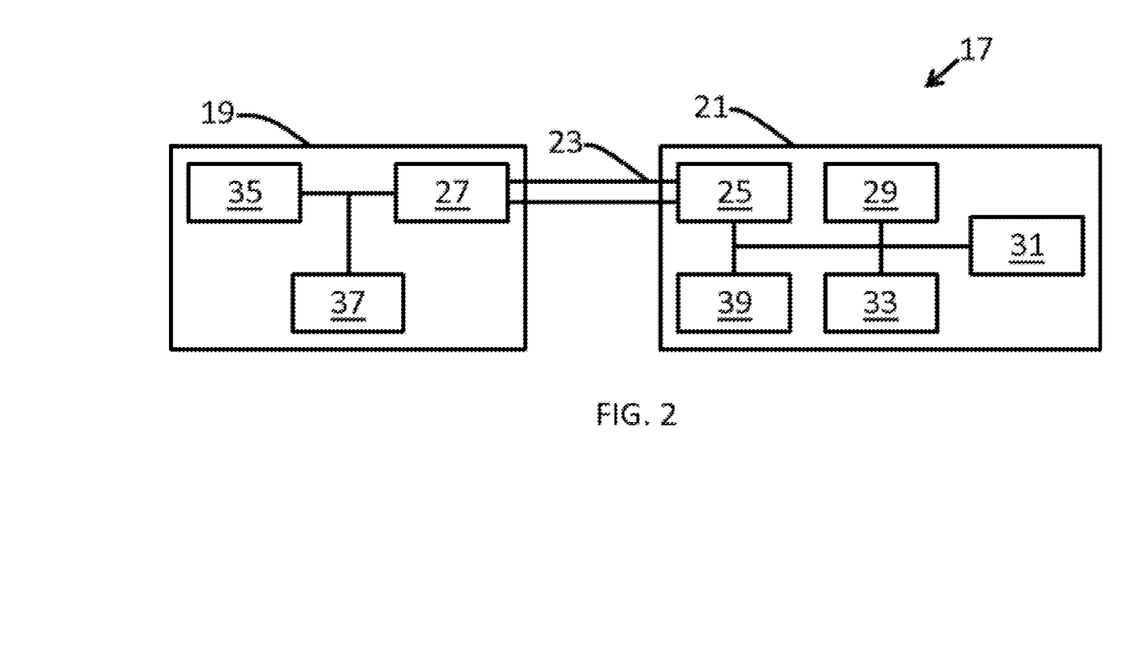
FIG. 2 schematically illustrates a velocity measurement device according to an example embodiment.

FIG. 2 shows an example of a velocity measurement device 17 that uses Doppler radar to determine the velocity of the water 3. The velocity measurement device 17 is split into two separate units, an external control unit 19 and a radar unit 21. The external control unit 19 includes a battery 35 for powering the velocity measurement device 17, and a controller 37 for controlling operation of the velocity measurement device 17. The radar unit 21 includes a radar module 33 for transmitting and receiving microwaves, and determining the velocity based on the Doppler shift of the reflections.

The radar module 33 may be any suitable radar means for carrying out Doppler radar velocity measurements, and may include one or more microwave transmitters, and receivers, and processing means to determine the velocity based on the time of flight of the reflections from the water.

The external control unit 19 and radar unit 21 are coupled by a two wire interface 23 (also called a two wire loop). The two wire interface 23 is used to transfer power from the external control unit 19 to the radar unit 21, and for data transfer between the external control unit 19 and the radar unit 21. In at least some embodiments, use of the two wire interface for power transfer and data transfer provides a simple, lightweight and small unit that can be permanently installed in confined spaces, or used as part of a portable apparatus.

In use, the external control unit 19 behaves as a master, and controls the operation of the radar unit 21, as a slave. In particular, the external control unit 19 controls when the radar unit 21 takes a measurement of the velocity. The operation of the external control unit 19, and hence the velocity measurement device 17 as a whole is managed by the external control unit controller 37.

Between measurements, the radar unit 21 and two wire interface 23 are deactivated, so no energy is transferred over the two wire interface 23. The external control unit 19 is also arranged to minimise its power consumption between measurements. This ensures energy losses between measurements are minimised.

Figure 3:
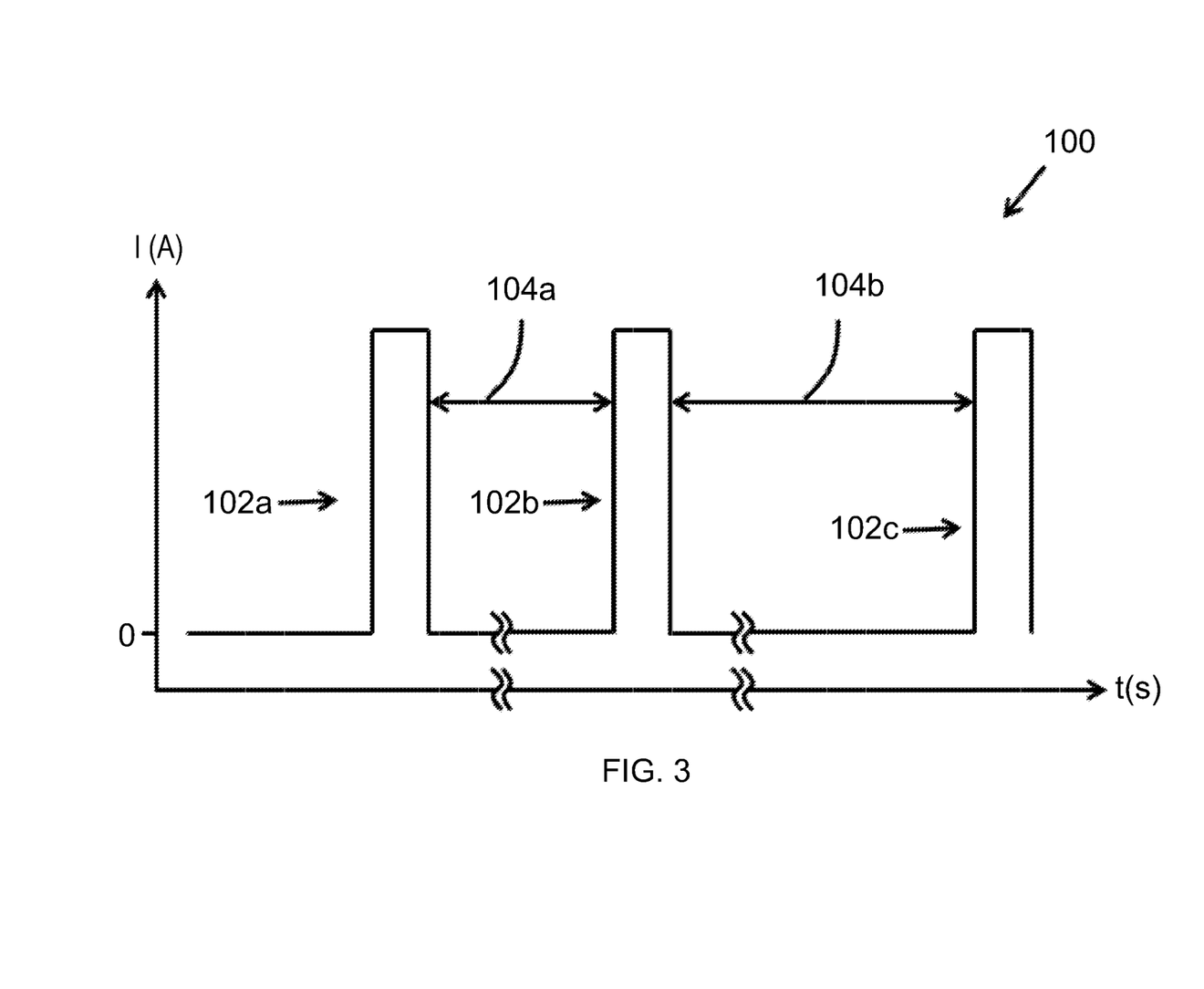
FIG. 3 is an example plot of the variation of the current on the two wire interface with time, showing three different velocity measurements.

FIG. 3 shows an example of the current 100 on the two wire interface 23 over a period incorporating three separate velocity measurements 102a, 102b, 102c. The time 104 between the velocity measurements 102 can be fixed, or variable, and can be based on a number of factors, including: user input, and/or a default time, and/or the previous level over water in the channel 1 or in a sump or well (not shown) the channel 1 flows into or out of and/or the previously measured flows.

For example, the first measurement 102a may determine a relatively fast flow rate for water flowing into a nearly full sump. Therefore, the time 104a between the first measurement 102a and the second measurement 102b may be set relatively short, as there is a risk of the sump overflowing and so regular monitoring is required. However, the second measurement 102b may determine that the flow rate has slowed, and so the time between the second measurement 102b and the third measurement 102c may be set relatively long.

The time 104 between measurements 102 can be any suitable value, and may be of the order of a few seconds, a few minutes, a few hours, or any time in between or longer.

As can be seen, between the measurements 102, the current on the two wire interface 23 is 0 milliamps. Once the external control unit controller 37 determines that it is time to take a measurement, the two wire interface 23 activates.

Figure 4:
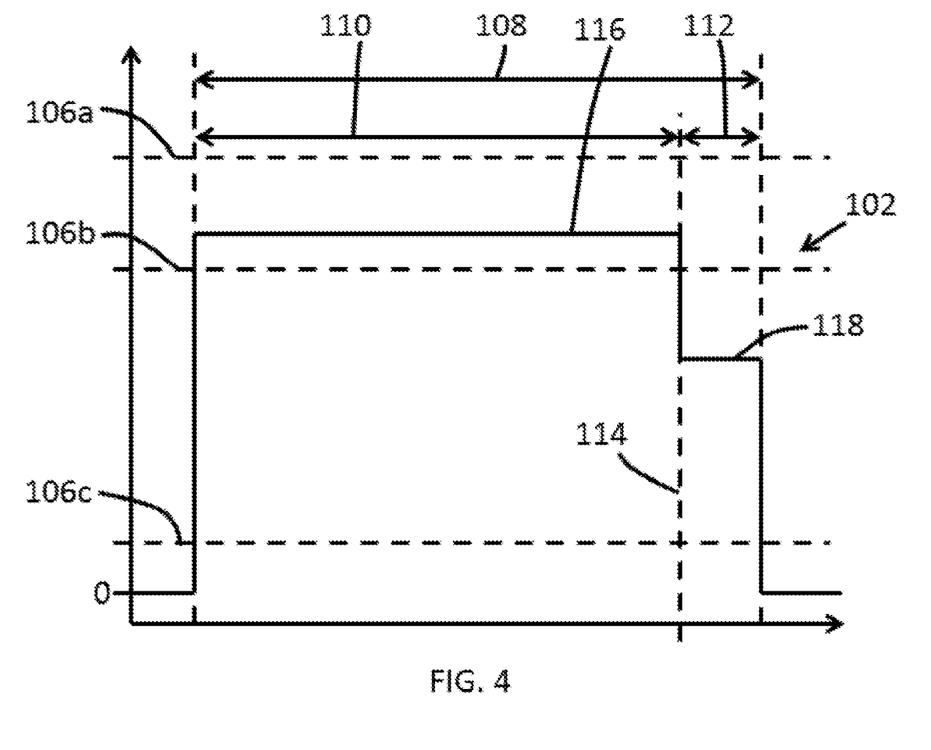
FIG. 4 shows one of the velocity measurements shown in FIG. 3, in more detail.

FIG. 4 shows the current during a measurement (or active period) 102 in more detail. The current can be any value between 0 milliamps and a maximum 106a of 25 milliamps. The period when the two-wire interface 23 is active is divided into a first portion in which the measurement occurs, and a second portion in which data transfer occurs. In the second portion, currents between a lower boundary 106c of 4 milliamps and an upper boundary 106b of 20 milliamps are used to communicate information over the interface 23.

At the start of the active period, the current is set, by the external control unit 19, to a first value 116, outside the communication range 106b,c, such as 22 milliamps. The radar unit 21 includes a second controller 31. The radar unit controller 31 detects the current 116 and determines that an active period has started.

The equipment of the Doppler radar module 33 requires a higher power level than can be delivered over the two wire interface 23. This means that the radar module 33 cannot be directly powered over the two wire interface 23. Therefore, the radar unit 21 includes an energy store 29 which is used to power the radar module 33. The energy store 29 is charged for longer than the radar module 33 is used for. This means that the energy store 29 has more energy than is delivered over the two wire interface 23 during the period the radar module 33 is operated for, and so can deliver higher power to the radar module 33 than the two wire interface 23 during use. The use of the energy store 21 means that in at least some embodiments, high power Doppler radar equipment to be used, but the flow measurement device remains low power overall.

At the start of the active period 102, the radar unit controller 31 determines how much energy is in the energy store 29, and determines how much energy can be used by the radar module 33, whilst still leaving sufficient energy to repeat the same measurement, without the energy store being replenished.

The radar unit controller 31 then controls the radar unit 21 to take measurements of the velocity. Each measurement may include several individual readings of the velocity by emitting a wave a detecting the reflection, and the radar module 33 is active for the period the reading is taken for. Each reading lasts for a short duration, due to the time of flight for waves to reflect from the water surface 7.

The number of waves/reflections used in a reading (controlled by the duration of each reading), the output power in the radar waves, the number of repeat readings, the interval between repeat reading and the number of transmitter and receivers used can be controlled based on the energy in the energy store 29. Generally, the more waves/reflections, longer measurement duration and higher power, the more accurate (and hence higher quality) the measurement, but the more power is consumed. In at least some embodiments, control of the different properties of the measurements means that energy in the energy store 29 is used in an efficient manner.

By the end of the first portion of the active period 102, the velocity measurements are complete. For the duration of the second portion, the current is set to a second value 118, within the communication range. The second current 118 is proportional to the determined velocity. The radar unit 21 includes a communication module 25, which converts the determined velocity into the second current 118. Similarly, the external control unit 19 includes a communication module 27, which reconverts the current back to the velocity for use in the external control unit 19.

After the end of the second portion, the two-wire interface 23 is deactivated, and the current returns to 0 milliamps.

Measurement occurs in the first portion of the active period 102, and communication in the second portion. Over both portions, the current on the two-wire interface 23 is also used to charge the energy store 29, such that it is not depleted over continuous use.

The length 110 of the first portion of the active period is between 4 and 5 seconds. This provides sufficient time for measurements and charging. Typically, the measurements may only take a few milliseconds, over the course of first portion. The second portion is a small fraction of a second in length. For example, the second portion is a few milliseconds in length.

The current in the communication range 106*b,c* is calibrated depending on the physical characteristics of the channel 1, so that the lowest possible velocity in the channel is transferred by a second current 118 of 4 milliamps, and the fastest possible velocity is transferred by a second current 118 of 20 milliamps. In this way, the same device can be used in different channels 1, and still provide high resolution.

If the radar unit controller 31 determines that no measurement is possible due to insufficient charge in the energy store 29, then the radar unit controller 31 skips the measurement, and uses the first portion of the active period 102 for charging only. In the second portion of the active period 102, the two wire interface 23 may also be used to transfer an error code. This may be in the case that the velocity measurement was not possible due to system malfunction, or insufficient charge in the energy store 29.

The external control unit controller 37 may be arranged to determine patterns in the error codes. For example, if error codes occur every other measurement, the external control unit 19 may determine that insufficient energy is getting into the energy store 29, and increase the duration of the first portion, or activate the two wire interface 23 for a charging period to provide further charge into the energy store 29.

Alternatively, for a number of consecutive error codes, the external control unit 19 may determine a system malfunction.

The error code is transferred by a current set outside the communication range 106*b,c*. For example, the first current level 116 may be used as an error code. Different current levels may also be used for different error codes. For example, the first current 116 may be used to indicate insufficient charge, and a second current (for example 25 milliamps, may be used to indicate other errors.

The external control unit 19 can also be used to provide configuration and setup commands to the radar unit 21 prior to use. For example, the length of the first portion of the active period 102 may be set, and the communication range may be calibrated. This can be done by modulation of the current over the two-wire interface 23. The modulation can be encoded and decoded by the controllers 37, 31 in the radar unit 21 and external control unit 19. During operation when the setup and configuration is being carried, out, the current on the two wire interface 23 can provide additional charging.

The radar unit 21 includes a small non-volatile lower power memory 39. This is a 4 kilobyte non-volatile memory that is used to store the velocity determined in at least the most recent measurement. The memory may also store other related information, and more than the single most recent measurement. The memory 39 can be read over the two wire interface 23. At the end of the active period, the memory is updated and/or overwritten with the new velocity reading.

The operation described above ensures that the battery 35 in the external control unit 19 is used in an efficient manner, and the battery life may be extended to years in length, whilst still allowing the most accurate possible readings.

The external control unit 19 may be provided separately to the radar unit 21. The external control unit 19 may be any suitable device that uses the same communication protocols as the radar unit 21. For example, the external control unit 19 may be any handheld or portable computer (not shown). Furthermore, the radar unit 21 may be used interchangeably with any suitable external control unit 19. The protocols may be provided separately, so any existing computer may be used as the external control unit 19.

In some examples, the external control unit 19 may be part of a controller 13 for a flow measurement device 11, or the external control unit 19 may be incorporated into the controller 13 for a flow measurement device 11. In this case, the velocity measurement is used to determine the flow.

It will be appreciated that the timings discussed above given are by way of example only, and any suitable timings may be used. The lengths of the respective portions 110, 112, and the total lengths of the active period 108 should be sufficient to ensure readings can be taken, the results communicated and charge is transferred to the energy store 29.

In the example discussed above, the active period is of fixed length 110. Alternatively, the active period length 110 may be variable. The active period length 110 may be varied on a similar basis to the gap between measurements, for example, user input, previous measurements and the like. In other examples, the active period length 110 may vary following a predefined pattern.

The currents given above are also only given by way of example only, and any suitable ranges may be used. Furthermore, in the above examples, only currents above the maximum in the communication range 106*b*, and below the overall maximum 106*a* for the two wire interface 23 are used. However, currents below the minimum in the communication range 106*c*, and above 0 milliamps could also be used. Furthermore, in some examples, the current may be at or below the maximum in the communication range 106*b* for charging.

It will also be appreciated that separate charging windows, where no measurements are made, may be included as a matter of course, rather than in response to error messages, although this is optional.

The radar unit controller 31 may use different criteria for determining how much energy from the energy store 29 can be used. For example, it may determine the useable energy in the energy store 29 such that only the minimum accuracy measurement can be repeated without further charging, or it may leave a preset amount of energy in the energy store 29. Alternatively, it may try to use all of the energy in the energy store 29, without leaving any in reserve.

Furthermore, the radar unit controller 31 may be arranged to control the time 104 between measurements, based on the amount of energy in the energy store 29.

In the above description, the current on the two wire interface 23 is modulated to provide setup and configuration commands. It will be appreciated that any suitable communication protocol may be used instead. For example, the absolute value of the current may be set to different levels. Similarly, any suitable protocol may be used to communicate the measured velocity.

The battery may be any suitable type of power supply, and may be rechargeable.

The memory 39 may be any suitable non-volatile memory. In the above example, the memory 39 is a 4 kilobyte memory. However, the memory 39 may be any suitable size, down to 16 bit. The amount of past information stored in the memory 39 will vary in dependence on the size of the memory 39.

Where the velocity measurement device 17 is used for determining a flow, any suitable level measurement device 15 can be used. The level measurement device may be powered from the same battery 35 as the velocity measurement device 17, or a different battery (not shown). The level measurement device 15 may use a similar two wire loop, with similar control to the velocity measurement device, or not. The two measurement devices 15, 17 may also be provided in the same housing or different housing.

The velocity measurement device 17 may be provided on its own, without incorporation in a flow measurement device 11. The flow measurement device 11 and/or velocity measurement device 17 are for use with any type of media, such as, but not limited to, fluids and solids.

The controller 31, 37 may be any suitable processors, controllers, or combination of the two. The controller may also be implemented by a combination of discrete electronic components (such as op-amps comparators) arranged so as to perform the function of comparing levels of voltages and current, and the ability to switch on and off other electronic circuitries.

The invention claimed is:

1. A velocity measurement device for measuring the velocity of a moving media in a channel, the velocity measurement device including a radar unit having:
   a radar module arranged to measure the velocity of the media using the Doppler effect;
   a two wire interface to the radar unit arranged to receive power from an external power source, and provide data transfer between the radar unit and an external control unit;
   an energy store arranged to:
      receive energy available on the two wire interface to charge the energy store;
      store the received energy; and
      supply the stored energy to the radar module when a velocity measurement is performed; and
   a radar unit controller arranged to, during an active period of the device:
      control the radar module to take one or more readings of the velocity of the media to provide a measurement of the velocity; and
      control operation of the radar unit to charge the energy store,
   wherein the two wire interface is inactive between active periods of the device such that no power is delivered to the radar unit between active periods.

2. The velocity measurement device of claim 1, wherein the power delivered over the two wire interface is insufficient to power the radar module directly, and the energy stored in the energy store over a period longer than the radar module is operated for is sufficient to power the radar module.

3. The velocity measurement device of claim 1, wherein the radar module is arranged to measure the velocity of the moving media within the active period of the device,
   wherein the active period is divided into a first portion in which the velocity of the media is measured, and a second portion in which the measured velocity is communicated to the external control unit, and
   wherein the energy store is charged during at least the first portion of the active period.

4. The velocity measurement device of claim 1, wherein the radar unit controller is further arranged to:
   determine the energy stored in the energy store;
   determine the proportion of the energy that can be used in a velocity measurement; and
   control the radar module to measure the velocity based on the determined portion of the energy that can be used.

5. The velocity measurement device of claim 4, wherein the radar unit controller is arranged to vary one or more of: an output power of the radar module; a measurement duration; a number of repeat readings in a measurement; an interval between repeat readings; and a number of individual transmitters and/or receivers used based on the determined portion of the energy that can be used.

6. The velocity measurement device of claim 4, wherein the radar unit controller is arranged to leave a minimum level of energy in the energy store, such that the measurement can be repeated without the energy store being replenished.

7. The velocity measurement device of claim 6, wherein the radar unit controller is arranged to:
   omit a velocity measurement if it is determined that the energy store does not have sufficient energy to power the radar module and leave the minimum level of energy in the energy store; and
   only charge the energy store during the measurement.

8. The velocity measurement device of claim 1, including:
   an external control unit arranged to:
      control operation of the radar unit; and
      communicate with the radar unit over the two wire interface; and
   a power supply for providing power to the radar unit over the two wire interface, and powering operation of the external control unit.

9. The velocity measurement device of claim 8, wherein:
   the external control unit is arranged to control the operation of the radar unit such that the velocity is measured intermittently; and the external control unit is arranged to deactivate the two wire interface between velocity measurements.

10. The velocity measurement device of claim 9, wherein the external control unit is arranged to determine the duration between velocity measurements based on one or more of: a default value, a user input, and one or more previous velocity measurements.

11. The velocity measurement device of claim 1, wherein the radar module is arranged to use microwave radar to measure the velocity of the media.

12. The velocity measurement device of claim 11, the radar module including:
   means for transmitting microwaves;
   means for detecting radar microwaves reflected from the moving media; and
   means for determining the velocity of the moving media based on the reflected waves,
   wherein the radar module is powered by the energy store.

13. The velocity measurement device of claim 1, wherein:
   the two wire interface is arranged to carry a maximum current; and
   the current on the two wire interface is varied between a first current and a second current, both lower than the maximum current, to transfer data between the external control unit and the radar unit.

14. The velocity measurement device of claim 13, wherein the current the two wire interface is higher than the second current to indicate an error message.

15. A flow measurement device for measuring the flow rate of a moving media in a channel, the flow measurement device including:
   a level measurement device for determining the level of the moving media in the channel; and
   a velocity measurement device according to claim 1, for measuring the velocity of the moving media in the channel,
   wherein the flow measurement device is arranged to determine the flow based on the measured level and the measured velocity.

16. A method of measuring the velocity of a moving media in a channel, the method including:
   activating a two wire interface to supply power from an external power source to a radar unit;
   at the radar unit, receiving power over the two wire interface;
   storing energy received on the two wire interface in an energy store of the radar unit;
   with a radar module of the radar unit, measuring the velocity of the media in the channel using the Doppler effect by taking one or more readings of the velocity of the media during an active period of the two wire interface, wherein stored energy from the energy store is supplied to the radar module when a velocity measurement is performed;
   transferring the measured velocity to an external control unit over the two wire interface; and
   deactivating the two wire interface between active periods such that no power is delivered to the radar unit.

17. The method of claim 16, wherein the power delivered over the two wire interface is insufficient to power the radar module directly, and the energy stored in the energy store over a period longer than the radar module is operated for is sufficient to power the radar module.

18. A device for measuring the velocity of a moving media in a channel, the device comprising:
   a processing device; and
   a computer readable medium in communication with the processing device, the computer readable medium comprising one or more programming instructions for causing the processing device to:
      activate a two wire interface to supply power from an external power source to a radar unit;
      at the radar unit, receive power over the two wire interface;
      store energy received on the two wire interface in an energy store of the radar unit;
      with a radar module of the radar unit, measure the velocity of the media in the channel using the Doppler effect by taking one or more readings of the velocity of the media during an active period of the two wire interface, wherein stored energy from the energy store is supplied to the radar module when a velocity measurement is performed;
      transfer the measured velocity to an external control unit over the two wire interface; and
      deactivate the two wire interface between active periods such that no power is delivered to the radar unit.

* * * * *